(12) United States Patent
Tanner et al.

(10) Patent No.: US 6,375,565 B1
(45) Date of Patent: Apr. 23, 2002

(54) APPARATUS FOR SLICING SEED STOCK

(75) Inventors: Max W. Tanner; Lynn M. Turner, both of Blackfoot, ID (US)

(73) Assignee: E. M. Tanner & Sons, Inc., Blackfoot, ID (US)

( * ) Notice: Subject to any disclaimer, the term of this patent is extended or adjusted under 35 U.S.C. 154(b) by 0 days.

(21) Appl. No.: 09/706,084

(22) Filed: Nov. 3, 2000

(51) Int. Cl.[7] .................. A01D 13/00; A01D 21/00; A01D 45/00
(52) U.S. Cl. .................................. 460/123; 209/671
(58) Field of Search .............................. 209/671, 672, 209/668, 674, 667, 673; 460/123, 135, 132, 140

(56) References Cited

U.S. PATENT DOCUMENTS

| | | | | |
|---|---|---|---|---|
| 1,498,144 A | * | 6/1924 | Avery .................. | 209/667 |
| 2,618,385 A | * | 11/1952 | Silver et al. .......... | 209/669 |
| 2,670,846 A | * | 3/1954 | Rienks et al. ........ | 209/671 |
| 3,519,129 A | * | 7/1970 | Peterson .............. | 209/671 |
| 4,044,697 A | | 8/1977 | Swanson .............. | 111/66 |
| 4,259,912 A | | 4/1981 | Stocks et al. ......... | 111/77 |
| 4,264,023 A | | 4/1981 | Stocks et al. ......... | 222/614 |
| 5,012,933 A | * | 5/1991 | Artiano ................. | 209/671 |
| 5,590,792 A | * | 1/1997 | Kobayashi ............ | 209/667 |
| 5,740,922 A | * | 4/1998 | Williams .............. | 209/668 |
| 6,264,043 B1 | * | 1/2000 | Mobley ................. | 209/669 |
| 6,241,100 B1 | * | 6/2001 | Tanner et al. ........ | 209/671 |

* cited by examiner

*Primary Examiner*—Robert E. Pezzuto
*Assistant Examiner*—Árpád F. Kovács
(74) *Attorney, Agent, or Firm*—Kirton & McConkie; Michael F. Krieger

(57) ABSTRACT

A tuber seed cutting apparatus includes a cutting section, a transport section, and a conveyor section. The cutting section includes a plurality of coulter blades coaxially spaced apart on a common axis. The transport section comprises a transport bed having a first side and an opposite second side and a plurality of rollers. The rollers move as a bed generally in a first direction towards the coulter blades, but rotate in a direction opposite the direction of the transport bed. The rollers comprise a plurality of first roller types and a plurality of second roller types that are placed adjacent either the first side or the second side, the second roller types being generally cylindrical and having a diagonal ridge placed on the circumference of the second roller type to direct items away from the sides and towards the center of the transport bed.

16 Claims, 4 Drawing Sheets

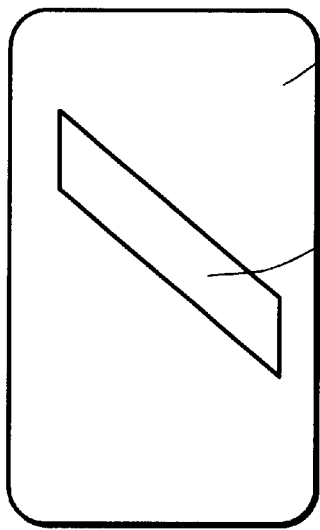 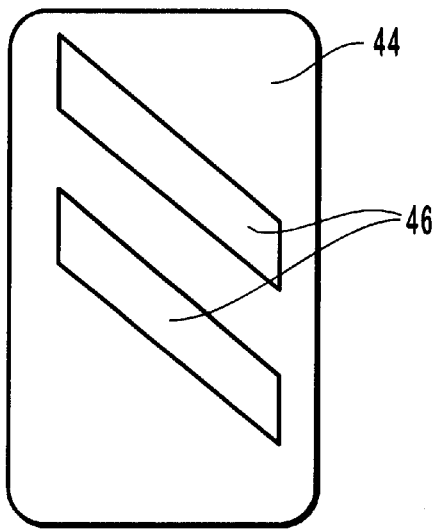
Fig. 3A    Fig. 3B
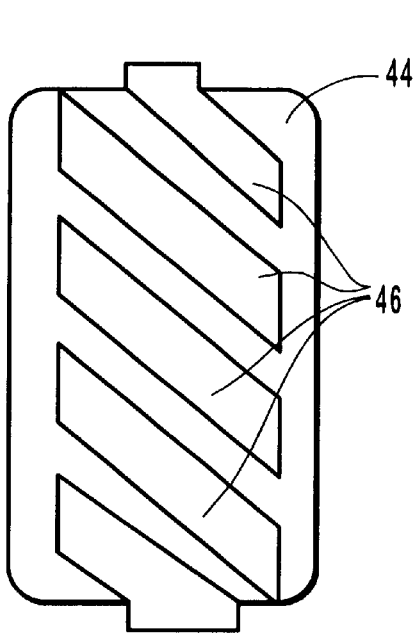 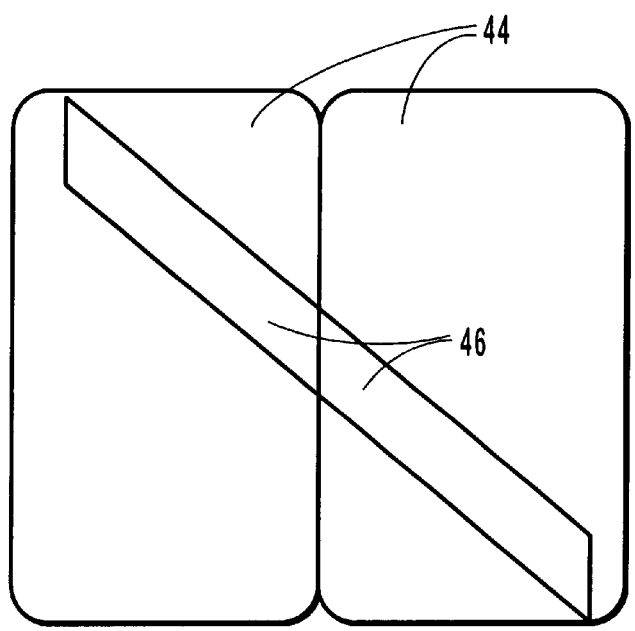
Fig. 3C    Fig. 3D

APPARATUS FOR SLICING SEED STOCK

BACKGROUND OF THE INVENTION

The present invention relates generally to tuber or root planting equipment used in planting potato seeds and, more particularly to a potato seed cutter apparatus, that provides a more uniform potato seed used to process seed.

Selected types of tuber vegetables, such as potatoes, sweet potatoes, yams, and the like, are seeded by slicing or dicing a seed tuber and planting the seed slice below the surface of the ground. Specifically, a potato is sliced into seed sections of about two to three inches square and then planted below the ground for the next crop. The process of slicing seed potatoes into seeds has been automated by the use of sophisticated machinery. The machinery passes a potato through a series of coulter blades to slice the potato into a section having the thickness of the distance between two adjacent coulter blades and then passes the section to a feeder for planting in the ground. There are problems associated with the current potato seed cutters that utilize a bank of coulter blades to slice the potato into seed sections.

One problem derives from dirt and debris not completely removed from the bulk seed source of seed potatoes left from a previous growing season. Often, debris and dirt, which includes small rocks roughly the size of the potatoes, passes over a transport grid and reaches the coulter blades. As rocks are much harder than the seed potatoes and even the coulter blades, the rocks damage the coulter blades or become lodged between the blades and prevent efficient slicing of the seed sections.

Another problem involving potato seed cutters is that the beds upon which the seed potatoes are placed so that they may be fed through the coulter blades suffer from potatoes lodging along the side paths of the beds, thereby jamming the feeder bed and coulter blades on the edges.

Yet, another problem involving the potato seed cutter machinery is that the seed potato sections often stick within the coulter blades due to the starch and moisture contained in the seed potato. With the potatoes sticking between the coulter blades and clogging them, the blades are unable to slice additional seed potatoes efficiently. Further still, the seed potatoes sometimes come in a variety of shapes that range between large and small relative to a desired average seed potato size. As they pass through the coulter blades, sections can still be of a size too large for efficient planting and handling by the planting apparatus of the seeding assembly.

Accordingly, what is needed is a tuber seed cutter apparatus that processes potatoes for planting, overcomes the observed problems of the prior art by directing the potatoes in the feed bed more efficiently towards the coulter blades, slices the seed potatoes more uniformly prevents seed potatoes from sticking within the coulter blade assembly and provides a more uniformed size of seed after slicing.

SUMMARY OF THE INVENTION

According to the present invention, a tuber seed cutting apparatus is disclosed that includes a cutting section and a transport section. The cutting section includes a plurality of coulter blades coaxially spaced apart on a common axis. The transport section comprises a transport bed having a first side and an opposite second side and a plurality of rollers. The rollers move as a bed generally in a first direction towards the coulter blades, but rotate in a direction opposite the direction of the transport bed. The rollers comprise a plurality of first roller types and a plurality of second roller types that are placed adjacent either the first side or the second side, the second roller types being generally cylindrical and having a diagonal ridge placed on the circumference of the second roller type to direct items away from the sides and towards the center of the transport bed.

The tuber cutting apparatus also includes a slicing blade, mounted generally radially to the coulter blades. The seed cutting section comprises a pair of rotating drums positioned adjacent the slicing blade for drawing tubers cut by the coulter blade device to the slicing blade. A plurality of stripper fingers are provided such that the fingers are placed between adjacent coulter blades. The coulter blade assembly is designed to move both left-right or u-down between a first position and a second position, either manually or automatically. The tuber seed cutting can also include a hopper with conveyor coupled to the transport bed as well as a tuber sorter and grader coupled to the transport bed conveyor, which is coupled to the coulter blade device.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 3 illustrates several side roller designs in accordance with the present invention.

DETAILED DESCRIPTION OF THE INVENTION

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 4, is not intended to limit the scope of the invention, as claimed, but is merely representative of the specific embodiments of the invention.

The specific embodiments of the invention will be best understood by reference to the drawings, wherein like parts are designated by like numerals throughout.

Figure 1:
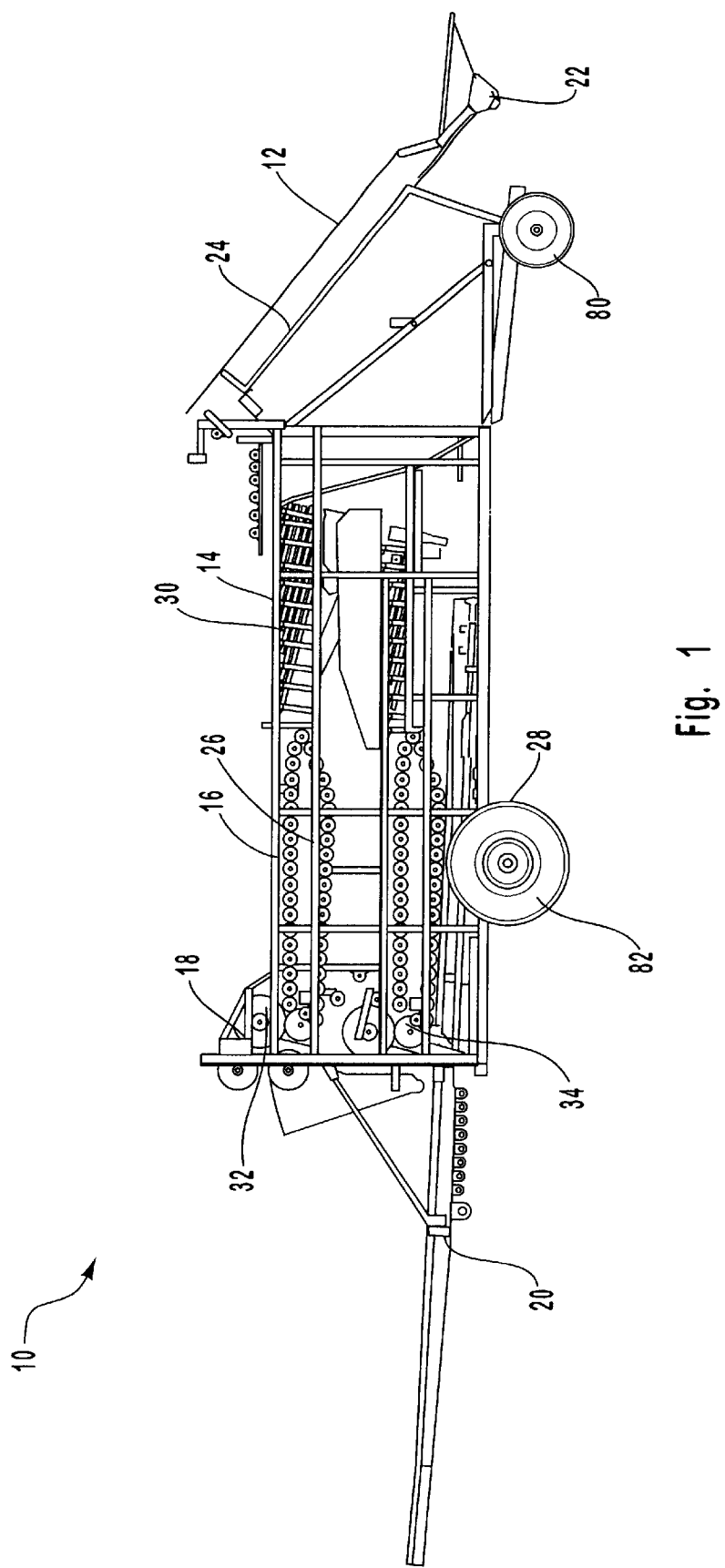
FIG. 1 illustrates an overall view of a tuber seed cutting and conveyor in accordance with the present invention.

A potato seed cutting apparatus 10 is shown in a side view of FIG. 1. Apparatus 10 includes a potato seed hopper feeder 12, coupled to a potato grader and sorter 14. Potatoes are delivered from grader and sorter 14, which delivers the sorted potatoes to a feed bed 16. Feed bed 16 transports and manipulates the potatoes to a seed cutting unit 18 in a controlled and uniform manner. Once the potatoes are sliced within seed cutting unit 18, they are fed to a seed conveyor 20, which delivers the seed sections to the next machine.

The potato seed hopper feeder 12 includes a hopper 22, which receives a load of potatoes used for seed. A conveyor 24 connects to hopper 22 and is utilized to deliver the potatoes to grader and sorter 14 and feed bed 16. Grader and sorter 14 sifts through the seed produce or potatoes to remove as much dirt and debris as possible. There are two stages in this embodiment which direct the potatoes to feed bed 16. Feed bed 16 includes a first level 26 and a second level 28. As conveyor 24 delivers the potatoes, they fall within a sorting tray 30 of first level 26 and are carried to seed cutting unit 18. Smaller potatoes and other debris fall through openings within sorting tray 30 and are fed to a second cutter section 34 by second level 28. Second level 28 is similar to first level 26, but is able to process seed potatoes that are too small for first level 26.

Hopper feeder 12 is well known to those skilled in the art and can be implemented using conventional equipment for such tasks. First level 26 begins a first cutting path 32 and second level 28 begins a second cutting path 34. Cutting path 32 receives larger potatoes from first level 26 path while cutting path 34 receives smaller potatoes from second level. Cutting unit 18 receives the potatoes from both paths and slices them accordingly and then delivers them for planting. Feed bed 16 and slicing unit 18 are illustrated in perspective view in FIG. 2 in accordance with the present invention.

Feed bed 16 includes both the first cutting path 32 and the second cutting path 34. Each cutting path comprises a series of rollers 36, mounted in parallel one with another, that form an endless loop with the top portion moving towards a set of coulter blades 38. Further, each roller 36 rotates in a direction opposite that of the direction towards the coulter blades 38. This action helps align the potatoes for optimal slicing by coulter blades 38. The feed bed 16 moves towards the coulter blades 38 via any of the following methods or means: direct drive, pulley, gear, or any other means suitable to one skilled in the art, which are generally driven by a combustion engine, with a suitable transmission, or electro-magnetic motor.

Each roller 36 generally comprises a shaft having a plurality of discrete rollers 42 mounted coaxially on the shaft. Each end of roller 36 includes one or more directional rollers 44 shown in greater detail in FIG. 3. Directional rollers 44 include at least one directional ridge 46, as shown singularly in FIG. 3A, that is aligned so that as the roller turns, it directs the potatoes and other debris towards the center of roller bed 16. Each ridge is generally slanted at an incline from the side of the bed towards the center of the bed in the direction in which each roller 44 turns. In alternative embodiments, ridges 46 can be mated in parallel, shown in FIG. 3B, spaced apart about the circumference of the generally cylindrical roller 44, and include multiple ridges 46, also shown in FIG. 3D, as deemed most efficient and effective in preventing jamming along the sides of the bed and directing produce towards the center of the bed. This prevents potatoes and debris from lodging in the side, which would otherwise jam the roller bed, as well as lodge between the coulter blades. Rollers 44 can also be mated in tandem as shown in FIG. 3D with ridges 46 forming a continuous strip.

Each roller 42 or 44, whether on the sides or positioned adjacent the sides and towards the middle of the bed, is made of a durable rubber-like material suitable for repeated use and that handles the potatoes without bruising or damaging them as they pass over the bed to the coulter blades. For example, U.S. patent application Ser. No. 09/387,639, filed Aug. 31, 1999, commonly assigned and incorporated by reference for all purpose, teaches of exemplary rollers that are utilized in the present invention.

Once the potatoes pass over bed 16, they meet potato slicer 18, which includes at least one or more cutting stations. Slicer 18 is shown in greater detail in FIG. 4, which illustrates a side view with cut away portions of the coulter blade and cutting assembly in accordance with the present invention. Each cutting station within slicer 18 comprises a plurality of coulter blades 38, which are space-apart discs that are mounted in parallel upon a rotating axle 50. The blades 38 rotate so as to be able to slice the potatoes as they pass through the blades. Each axle mounts to a bearing 52 and a support frame 54. Support frame 54 can move in a linear direction generally parallel to feed bed 16 for optimal slicing via an adjustment assembly 56. Adjustment assembly 56 is placed on both sides of the cutting assembly and includes a machine threaded bolt 58 that moves the end of the coulter blade assembly back and forth as bolt 58 is turned by a wrench. The bolt assembly allows for a single operator to set the distance of coulter blades 38 relative to the subsequent cutting stations found within slicer 18. Optionally, bolt 58 can be mated to a motor that turns the bolt, thereby moving coulter blades between a first and second position. The motor can be controlled by a switch operable by the operator of the seed slicing apparatus. Further still, sensors can determine whether the coulter blades should be closer or farther from the bed and adjust the bolts accordingly.

Further, slicer 18 also comprises a plurality of strippers 60 located within each pair of coulter blades 38. Strippers 60 are mounted on a support axle 62 that runs perpendicular to the direction bed 16 moves and parallel to axle 50 upon which the coulter blades are mounted. Strippers 60 can be finely adjusted up and down by turning of adjustment bolt 58 mated to either end of axle 62. Strippers 60 operate to remove potato slices from between the coulter blades as they are sliced, thereby preventing the sliced potatoes from remaining within the coulter blades.

Behind the coulter blades are a pair rotating drums that include a top drum 66 and a bottom drum 68. Top drum 66 turns in a clockwise direction while bottom drum 68 turns counter-clockwise or opposite that of top drum 66. Drums 66 and 68 grasp serve to direct potato slices of a given size that are considered too large to serve as efficient seeds to a second slicing station comprising slicing blade 70. Slicing blade 70 mounts generally parallel and between drums 66 and 68. Blade 70 includes a deflection flange 72 to direct the sliced potato seeds downward. By adjusting the tilt of the stripper and the distance of the coulters from the drums, the slices are directed to the spinning drums to slice the over-sized pieces.

Figure 2:
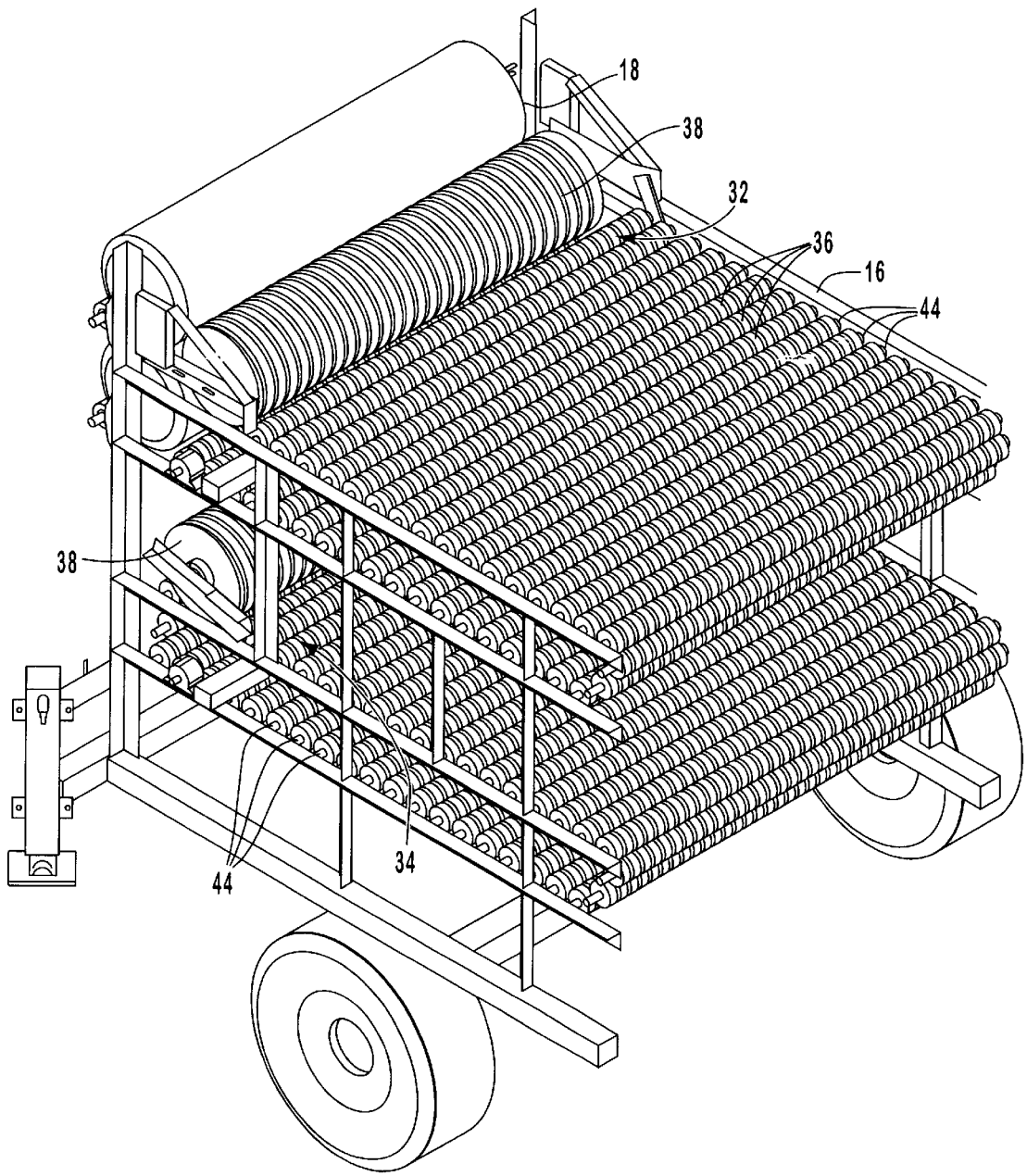
FIG. 2 illustrates a perspective view of a feed bed and slicer assembly as shown in FIG. 1 further illustrating the side rollers utilized within the invention.
Figure 4:
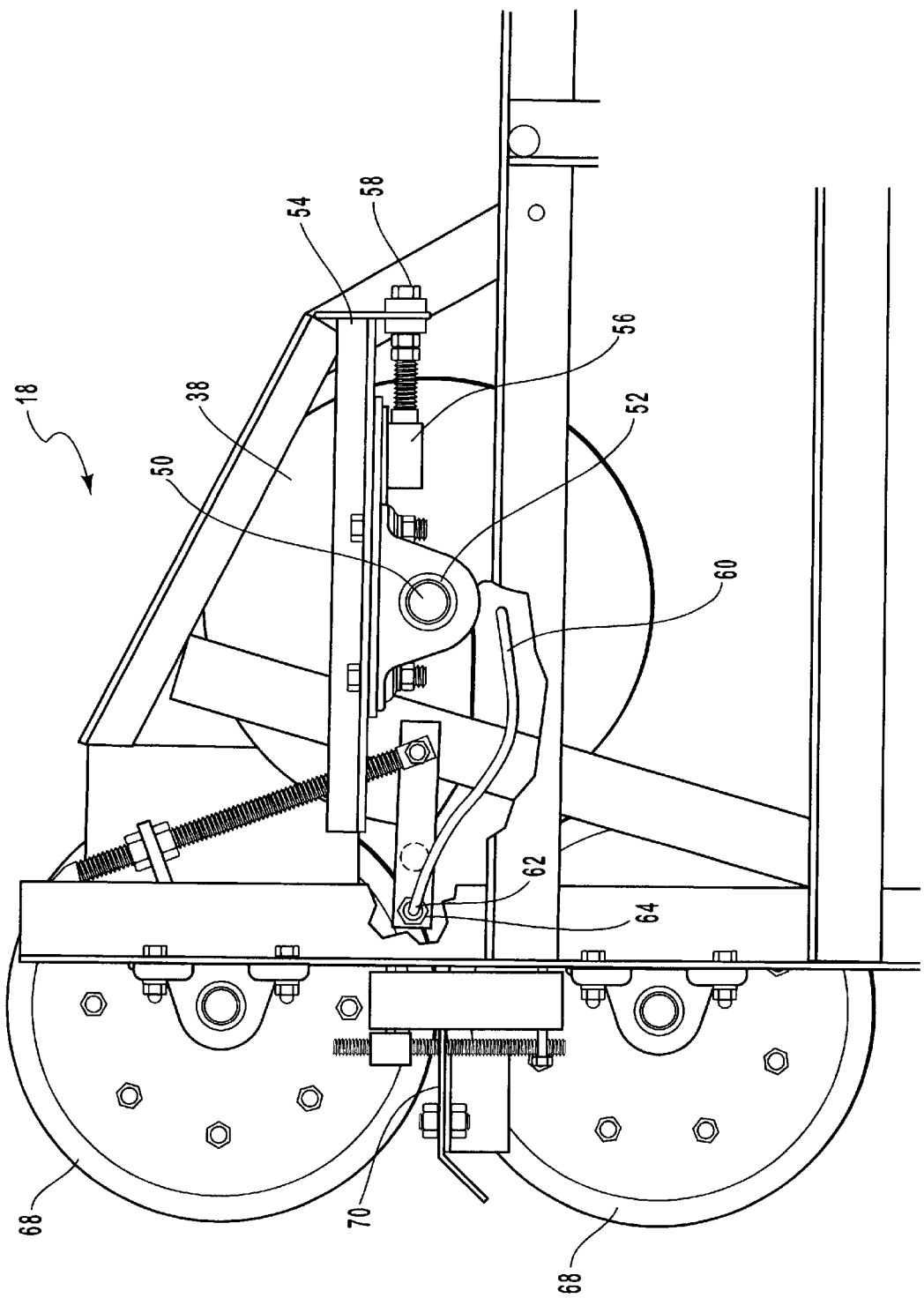
FIG. 4 illustrates the slicer unit of FIG. 2 in cross-sectional detail.

The second potato slicing path shown in FIG. 2 comprises the same coulter wheel assembly as that shown in the first slicing path, but optionally can include the rotating drums 66 and 68 and slicing blade 70. This is because the potatoes being sliced on the second path are much smaller then the potatoes being sliced on the first path. Therefore, they already will fall within an acceptable dimension for planting.

In either event, the seeds are then directed towards and handled by conveyor 20 shown in FIG. 1. The entire apparatus is mounted on wheels 80 and 82 that allows the apparatus to be drawn or driven in the field to be planted.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A tuber seed cutting apparatus comprising:
   a plurality of coulter blades coaxially spaced apart on a common axis; and
   a transport bed having a first side and an opposite second side and comprising a plurality of rollers with the transport bed moving in a first direction towards the coulter blades and the rollers rotating in a direction opposite the direction of the transport bed, the rollers comprising a plurality of first roller types and a plurality of second roller types that are placed adjacent one of the sides, the second roller types being generally cylindrical and having a diagonal ridge placed on the circumference of the second roller type to direct items away from the sides and toward the center of the transport bed.

2. The tuber seed cutting apparatus in accordance with claim 1, wherein the seed cutter device further comprises a slicing blade, mounted generally radially to the coulter blades.

3. The tuber seed cutting apparatus in accordance with claim 2, further comprising a pair of rotating drums positioned adjacent the slicing blade for drawing tubers cut by the coulter blade device to the slicing blade.

4. The tuber seed cutting apparatus in accordance with claim 1, further comprising a plurality of stripper fingers, each stripper finger being placed between adjacent coulter blades.

5. The tuber seed cutting apparatus in accordance with claim 1, where the coulter blade assembly is mechanically movable between a first and second position.

6. The tuber seed cutting apparatus in accordance with claim 1, further comprising a hopper with conveyor coupled to the transport bed.

7. The tuber seed cutting apparatus in accordance with claim 1, further comprising a tuber sorter and grader coupled to the transport bed.

8. The tuber seed cutting apparatus in accordance with claim 1, further comprising a seed conveyor coupled to the coulter blade device.

9. A tuber seed cutting apparatus comprising:
   a first cutting path and a second cutting path, each cutting path comprising:
      a plurality of coulter blades coaxially mounted in a spaced apart arrangement on an axle; and
      a transport bed having a first side and an opposite second side and comprising a plurality of rollers with the bed moving in a first direction towards the coulter blades and the rollers rotating in a direction opposite the direction of the transport bed, the rollers comprising a plurality of first roller types and a plurality of second roller types that are placed adjacent either the first side or the second side, the second roller types being generally cylindrical and having at least one diagonal ridge placed on the circumference of the second roller type to direct items away from the sides and towards the center of the transport bed.

10. The tuber cutting apparatus in accordance with claim 9, wherein the first cutting path further comprises a slicing blade, mounted generally radially to the coulter blades.

11. The tuber seed cutting apparatus in accordance with claim 10, wherein the first cutting path further comprises a pair of rotating drums, positioned adjacent the slicing blade, to draw tuber slices cut by the coulter blades to the slicing blade for a second cutting step.

12. The tuber seed cutting apparatus in accordance with claim 9, further comprising a plurality of stripper fingers, each stripper finger being placed between adjacent coulter blades.

13. The tuber seed cutting apparatus in accordance with claim 9, where the coulter blade axle is mechanically movable between a first and second position.

14. The tuber seed cutting apparatus in accordance with claim 9, further comprising a hopper with conveyor coupled with the transport bed.

15. The tuber seed cutting apparatus in accordance with claim 9, further comprising a tuber sorter and grader coupled to the transport bed.

16. The tuber seed cutting apparatus in accordance with claim 9, further comprising a seed conveyor coupled to the coulter blade device.

* * * * *